(12) United States Patent
Millet et al.

(10) Patent No.: US 6,302,654 B1
(45) Date of Patent: Oct. 16, 2001

(54) COMPRESSOR WITH CONTROL AND PROTECTION SYSTEM

(75) Inventors: Hank E. Millet, Piqua; Natarajan Rajendran, Huber Heights; William W. McCroskey, Sidney, all of OH (US)

(73) Assignee: Copeland Corporation, Sidney, OH (US)

( * ) Notice: Subject to any disclaimer, the term of this patent is extended or adjusted under 35 U.S.C. 154(b) by 0 days.

(21) Appl. No.: 09/515,802

(22) Filed: Feb. 29, 2000

(51) Int. Cl.[7] .................................................. F04B 49/00
(52) U.S. Cl. .......................... 417/63; 417/228; 417/281; 417/286; 417/287; 417/292; 417/310
(58) Field of Search ........................... 417/63, 228, 281, 417/286, 287, 292, 310

(56) References Cited

U.S. PATENT DOCUMENTS

| | | |
|---|---|---|
| 3,735,377 | 5/1973 | Kaufman . |
| 3,783,681 | 1/1974 | Hirt et al. . |
| 4,060,716 | 11/1977 | Pekrul et al. . |
| 4,102,394 | 7/1978 | Botts . |
| 4,372,119 | 2/1983 | Gillbrand et al. . |
| 4,390,321 | 6/1983 | Langlois et al. . |
| 4,390,922 | 6/1983 | Pelliccia . |
| 4,399,548 | 8/1983 | Castleberry . |
| 4,425,010 | 1/1984 | Bryant et al. . |
| 4,429,578 | 2/1984 | Darrel et al. . |
| 4,479,389 | 10/1984 | Anderson, III et al. . |
| 4,884,412 | 12/1989 | Sellers et al. . |
| 4,909,076 | 3/1990 | Busch et al. . |
| 4,913,625 | 4/1990 | Gerlowski . |
| 5,056,036 | 10/1991 | Van Bork . |
| 5,109,700 | 5/1992 | Hicho . |
| 5,203,178 | 4/1993 | Shyu . |
| 5,224,835 | 7/1993 | Oltman . |
| 5,362,206 | 11/1994 | Westerman et al. . |
| 5,381,692 | 1/1995 | Winslow et al. . |
| 5,509,786 | 4/1996 | Mizutani et al. . |
| 5,602,757 | 2/1997 | Haseley et al. . |
| 5,610,339 | 3/1997 | Haseley et al. . |
| 5,707,210 | 1/1998 | Ramsey et al. . |
| 5,975,854 | * 11/1999 | Culp, III et al. ................. 417/18 |
| 5,984,645 | * 11/1999 | Cummings ....................... 417/307 |
| 6,125,642 | * 10/2000 | Seener et al. ...................... 62/193 |

* cited by examiner

Primary Examiner—Charles G. Freay
Assistant Examiner—Eric Hayes
(74) Attorney, Agent, or Firm—Harness, Dickey & Pierce, P.L.C.

(57) ABSTRACT

A compressor protection and control subsystem for a rotary compressor provides temperature pressure, mis-wiring and vibrational protection for the scroll machine. The vibrational protection comprises a vibration sensor which is integrated on the circuit board of the protection and control subsystem. The vibration sensor, in conjunction with at least one timer, monitors the vibrations of the scroll machine and will shut down the machine when excess vibrations are sensed over a prespecified period of time. The temperature system monitors operating temperature conditions the pressure system monitors operating pressures and the mis-wiring system monitors the power supplied to the compressor. Once an undesirable characteristic is identified, the operation of the scroll machine is stopped. These protection systems are integrated into a single subsystem which identifies the reason of shutting off the scroll machine in order to simplify repairs needed. The subsystem incorporates a gateway and/or a serial peripheral interface in order to communicate with a central operating and control system.

22 Claims, 11 Drawing Sheets

COMPRESSOR WITH CONTROL AND PROTECTION SYSTEM

FIELD OF THE INVENTION

The present invention relates to the control and protection of compressors. More particularly, the present invention relates to a compressor control and protection system which combines compressor temperature control, phase protection, vibration protection, oil level control and protection, pressure sensing and pulse width modulation control.

BACKGROUND AND SUMMARY OF THE INVENTION

Scroll type machines are becoming more and more popular for use as compressors in both refrigeration as well as air conditioning applications due primarily to their capability of extremely efficient operation. Generally, these machines incorporate a pair of intermeshed spiral wraps, one of which is caused to orbit relative to the other so as to define one or more moving chambers which progressively decrease in size as the travel from an outer suction port toward a center discharge port. The means for causing the orbiting of one of the scroll members is in many cases an electrical motor. The electric motor operates to drive the one scroll member via a suitable drive shaft affixed to the motor rotor. In a hermetic compressor, the bottom of the hermetic shell normally contains an oil sump for lubricating and cooling purposes.

Scroll compressors depend upon a number of seals to be created to define the moving or successive chambers. One type of seal which must be created are the seals between opposed flank surfaces of the wraps. These flank seals are created adjacent to the outer suction port and travel radially inward along the flank surface due to the orbiting movement of one scroll with respect to the other scroll. Additionally sealing is required between the end plate of one scroll member and the tip of the wrap of the other scroll member. Because scroll compressors depend upon the seals between flank surfaces of the wraps and the seals between the end plates and opposing wrap tips, suction and discharge valves are generally not required.

While the prior art scroll machines are designed to run trouble free for the life of the scroll machine, it is still necessary to monitor the operation of the compressor and discontinue its operation when specific criteria have been exceeded. Typical operational characteristics which are monitored include the discharge temperature of the compressed refrigerant, the temperature of the motor windings, three-phase reverse rotational protection, three-phase missing phasesingle phase protection and an anti-short cycle. The monitoring of these characteristics and the methods and devices for monitoring these characteristics have been the subject of numerous patents.

Recently, it has been found that by monitoring the vibrational characteristics of the scroll machine, it is possible to predict problems with a scroll machine before these problems result in a failure to the entire system. For instance, in a refrigeration or air conditioning system which incorporates numerous scroll machines, the abnormal vibration of one of the scroll machines can result in a fracture of the refrigeration tube associated with that individual scroll machine. The fracture of this tube will result in a total loss of the system refrigerant, possible damage to property, expensive repairs and in some cases could be hazardous. Assignee's U.S. Pat. No. 5,975,854, the disclosure of which is incorporated herein by reference disclosed a device which is capable of independently monitoring the vibrational characteristics of an individual scroll machine.

Accordingly, what is needed is a system which is capable of communicating with and monitoring the operational characteristics of a compressor and/or a group of compressors. The system should have the ability to monitor all aspects of the operational characteristics of each of the compressor as well as having the ability to communicate with a central monitoring system to identify current or possible problems associated with the individual compressor. The central monitoring system can be a centralized rack gateway which communicates with each individual compressor, a rack/system control that acts as a gateway to communicate with each individual compressor or an Internet web server that communicates with a gateway associated with each compressor.

The present invention provides the art with an advanced compressor control and protection system. The advanced compressor control and protection system incorporates internally integrated sensing, protection and control functions not provided by the prior art motor protection modules in use today. The control and protection system of the present invention integrates these functions with the compressor for improved overall system cost, reliability and value and thus provides improved compressor protection, simpler system wiring, diagnostics and communications. The advanced compressor control and protection system of the present invention provides a common hardware platform for a broad range of compressor modules. The system of the present invention provides a reduction in cost due to common electronics platform for all sensing and control functions, higher reliability due to improved protection because of common logic incorporating a multiplicity of sensor and status information as well as reduction in cost and improved reliability due to reduction in field wiring of individual stand-alone protection systems.

The present invention utilizes a low-cost communications enabling approach using intermediate communications protocol to facilitate use of adapters and gateways for virtually any communications network with minimal cost burden on non-network applications. Multiple sensors are adapted for use internally within the compressor which provide signals which are analogous to the actual physical quantities being measured. Examples are discharge temperature, motor winding temperatures, gas pressure (suction, discharge) and differential pressures, liquid level, liquid refrigerant, relative percentage of liquid refrigerant versus oil and others.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 8 is a vertical cross-sectional view of a compressor having a capacity control system;

FIG. 10 is a plan cross-sectional view of a compressor having an oil injection system;

FIG. 16 is another oil sensor used with the compressor; and

DETAILED DESCRIPTION OF THE PREFERRED EMBODIMENT

Figure 1:
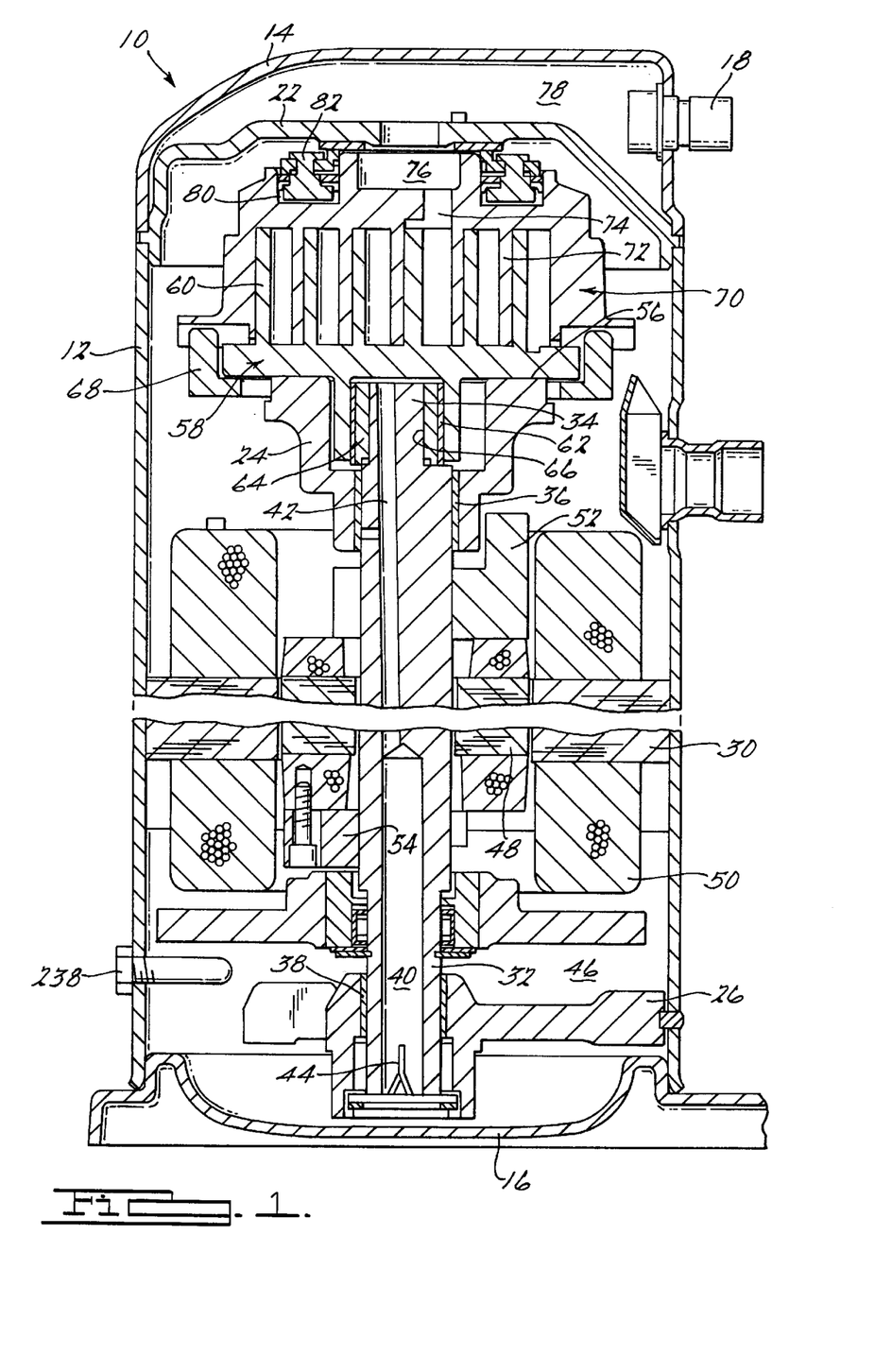
FIG. 1 is a vertical cross-sectional view through the center of a scroll type refrigeration compressor incorporating the control and protection system in accordance with the present invention.
Figure 2:
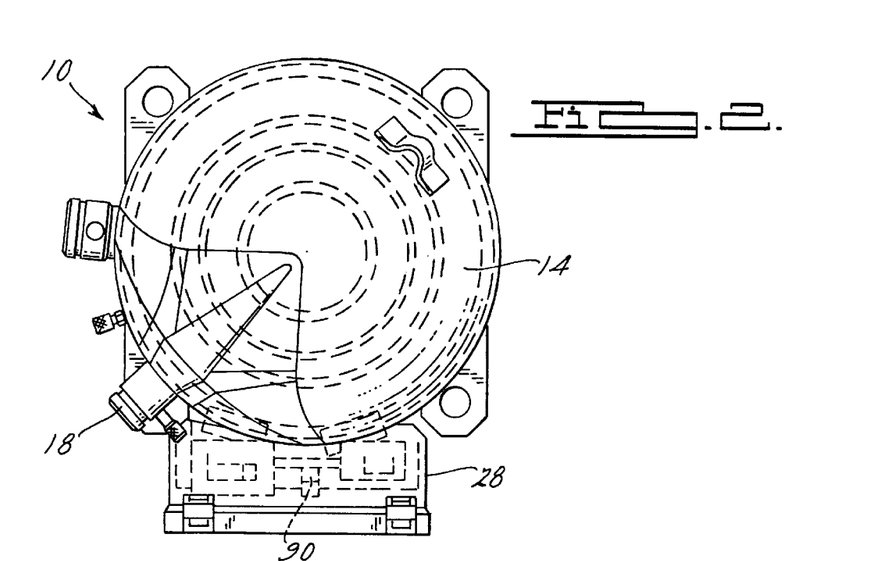
FIG. 2 is a top plan view of the compressor shown in FIG. 1.

Referring now to the drawings in which like reference numerals designate like or corresponding parts throughout the several views, there is shown in FIGS. 1 and 2 a scroll compressor which incorporates the compressor protection and control subsystem in accordance with the present invention which is designated generally by reference numeral 10. While the compressor protection and control subsystem is being illustrated for exemplary purposes in association with a hermetic scroll compressor, it is within the scope of the present invention to use the compressor protection and control subsystem with other rotary compressors also. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12, a lower bearing housing 26 also having a plurality of radially outwardly extending legs each of which is also suitably secured to shell 12 and an electrical enclosure 28 (FIG. 2). A motor stator 30 which is generally square in cross-section but with the corners rounded off is press fitted into shell 12. The flats between the rounded corners on the stator provide passageways between the stator and shell, which facilitate the return flow of lubricant from the top of the shell to the bottom.

A drive shaft or crankshaft 32 having an eccentric crank pin 34 at the upper end thereof is rotatably journaled in a bearing 36 in main bearing housing 24 and a second bearing 38 in lower bearing housing 26. Crankshaft 32 has at the lower end a relatively large diameter concentric bore 40 which communicates with a radially outwardly inclined smaller diameter bore 42 extending upwardly therefrom to the top of crankshaft 32. Disposed within bore 40 is a stirrer 44. The lower portion of the interior shell 12 defines an oil sump 46 which is filled with lubricating oil to a level slightly above the lower end of a rotor 48, and bore 40 acts as a pump to pump lubricating fluid up the crankshaft 32 and into passageway 42 and ultimately to all of the various portions of the compressor which require lubrication.

Crankshaft 32 is rotatively driven by an electric motor including stator 30, windings 50 passing therethrough and rotor 48 press fitted on the crankshaft 32 and having upper and lower counterweights 52 and 54, respectively.

The upper surface of main bearing housing 24 is provided with a flat thrust bearing surface 56 on which is disposed an orbiting scroll member 58 having the usual spiral vane or wrap 60 on the upper surface thereof. Projecting downwardly from the lower surface of orbiting scroll member 58 is a cylindrical hub having a journal bearing 62 therein and in which is rotatively disposed a drive bushing 64 having an inner bore 66 in which crank pin 32 is drivingly disposed. Crank pin 32 has a flat on one surface which drivingly engages a flat surface (not shown) formed in a portion of bore 66 to provide a radially compliant driving arrangement, such as shown in assignee's U.S. Pat. No. 4,877,382, the disclosure of which is hereby incorporated herein by reference. An Oldham coupling 68 is also provided positioned between orbiting scroll member 58 and bearing h housing 24 and keyed to orbiting scroll member 58 and a non-orbiting scroll member 70 to prevent rotational movement of orbiting scroll member 58. Oldham coupling 68 is preferably of the type disclosed in assignee's copending U.S. Pat. No. 5,320,506, the disclosure of which is hereby incorporated herein by reference.

Non-orbiting scroll member 70 is also provided having a wrap 72 positioned in meshing engagement with wrap 60 of orbiting scroll member 58. Non-orbiting scroll member 70 has a centrally disposed discharge passage 74 which communicates with an upwardly open recess 76 which in turn is in fluid communication with a discharge muffler chamber 78 defined by cap 14 and partition 22. An annular recess 80 is also formed in non-orbiting scroll member 70 within which is disposed a seal assembly 82. Recesses 76 and 80 and seal assembly 82 cooperate to define axial pressure biasing chambers which receive pressurized fluid being compressed by wraps 60 and 72 so as to exert an axial biasing force on non-orbiting scroll member 70 to thereby urge the tips of respective wraps 60, 72 into sealing engagement with the opposed end plate surfaces. Seal assembly 82 is preferably of the type described in greater detail in U.S. Pat. No. 5,156,539, the disclosure of which is hereby incorporated herein by reference. Non-orbiting scroll member 70 is designed to be mounted to bearing housing 24 in a suitable manner such as disclosed in the aforementioned U.S. Pat. No. 4,877,382 or U.S. Pat. No. 5,102,316, the disclosure of which is hereby incorporated herein by reference.

Figure 3:
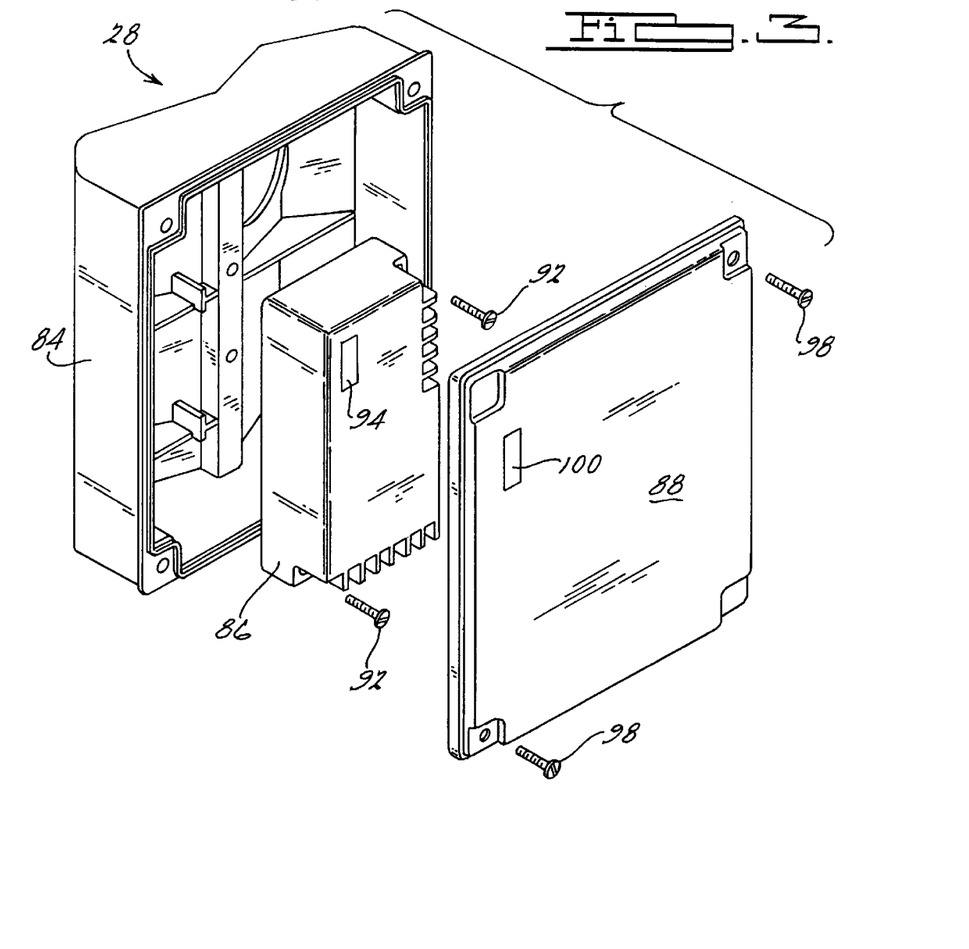
FIG. 3 is a perspective view of the electrical enclosure shown in FIG. 2.

Referring now to FIG. 3, electrical enclosure 28 includes an electrical case 84, a compressor protection and control subsystem 86 and a cover 88. Electrical case 84 is mounted to shell 12 using a plurality of studs 90 (FIG. 2) which are resistance welded to shell 12. Compressor protection and control subsystem 86 is mounted within electrical case 84 using a pair of mounting screws 92. Compressor protection and control subsystem 86 is connected to the various components of compressor 10 using wiring which has been omitted from the Figures for purposes of clarity. The connections for compressor protection and control subsystem 86 will be discussed in greater detail below. Compressor protection and control subsystem 86 includes a status display 94 which indicates the status of protection and control subsystem 86 and thus the operating status of compressor 10. Cover 88 is attached to electrical enclosure 84 using a plurality of screws 98. Cover 88 defines an aperture 100 which aligns with status display 94 to enable an individual to determine the operating status of compressor 10 without having to remove cover 88. Status display 94 is capable of displaying numbers and some alpha characters to indicate the various fault codes associated with compressor protection and control subsystem 86.

Figures 4, 6, 7:
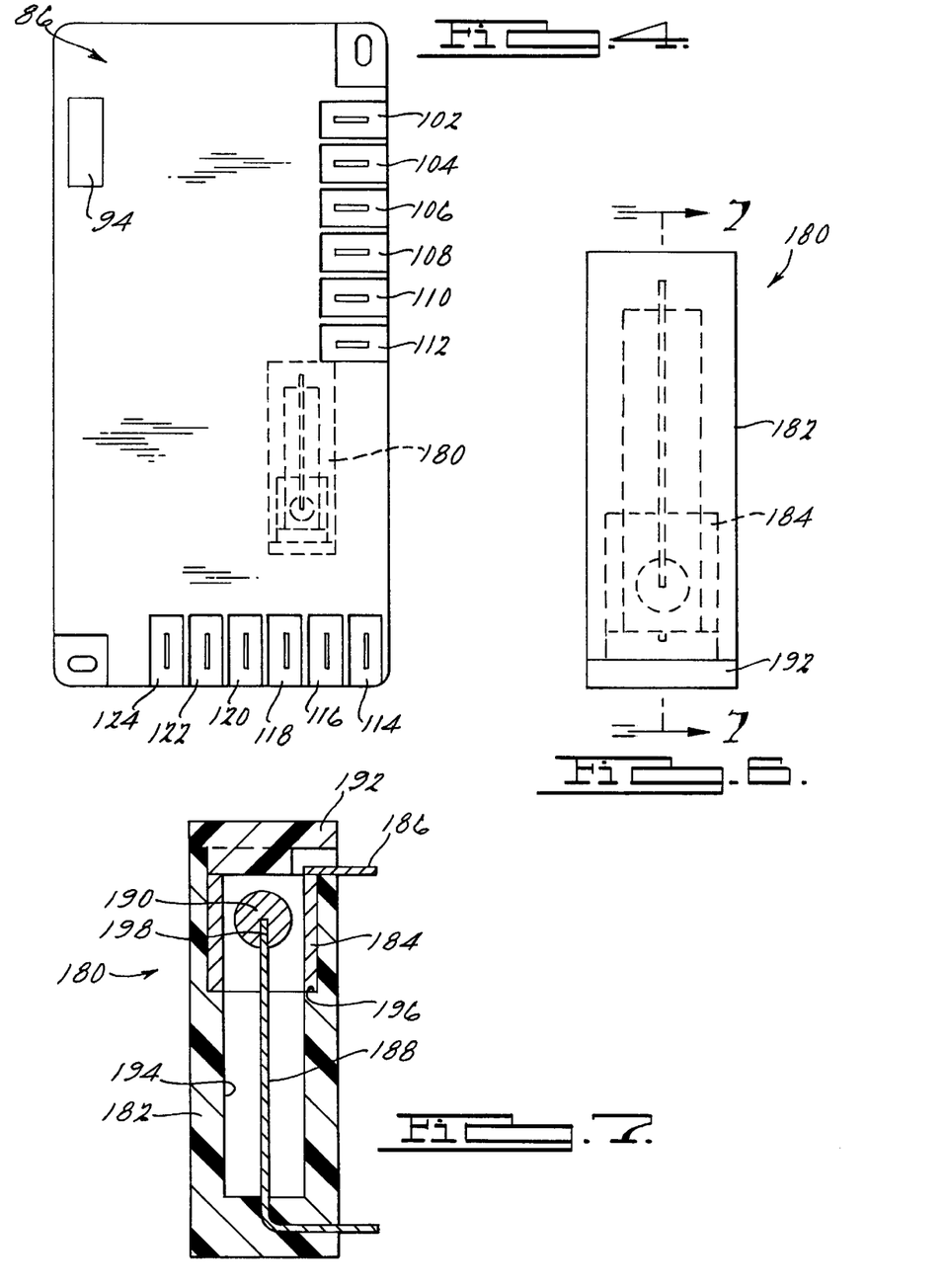
FIG. 4 is a side view of the compressor protection and control subsystem shown in FIG. 3.
FIG. 6 is a top plan view of the preferred implementation of the vibration sensor which can be incorporated into the compressor protection and control subsystem shown in FIG. 4.
FIG. 7 is a side cross sectional view of the vibration sensor shown in FIG. 5.
Figure 5:
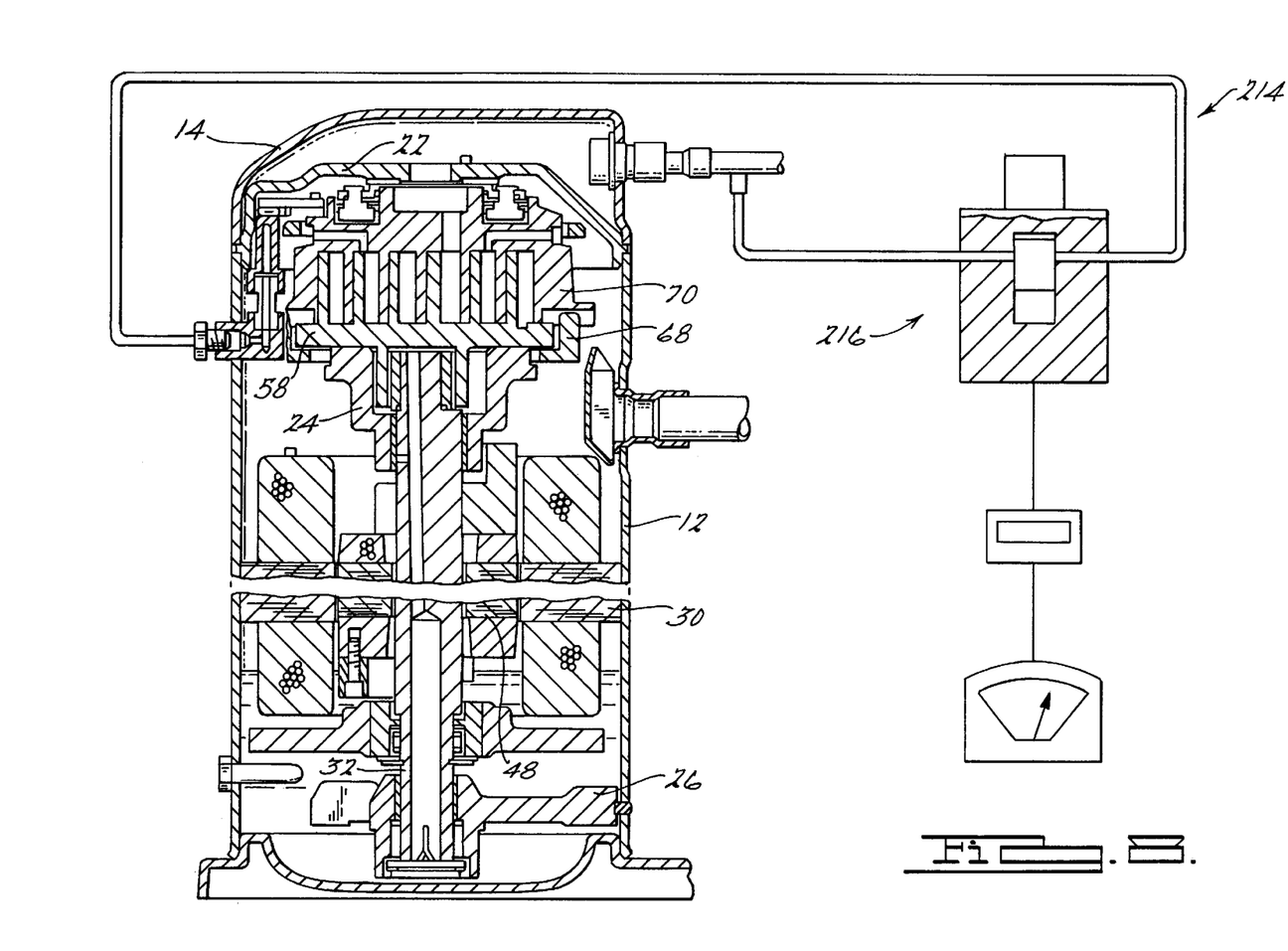
FIG. 5 is a functional block diagram of the compressor protection and control subsystem shown in FIG. 3.
Figure 7:
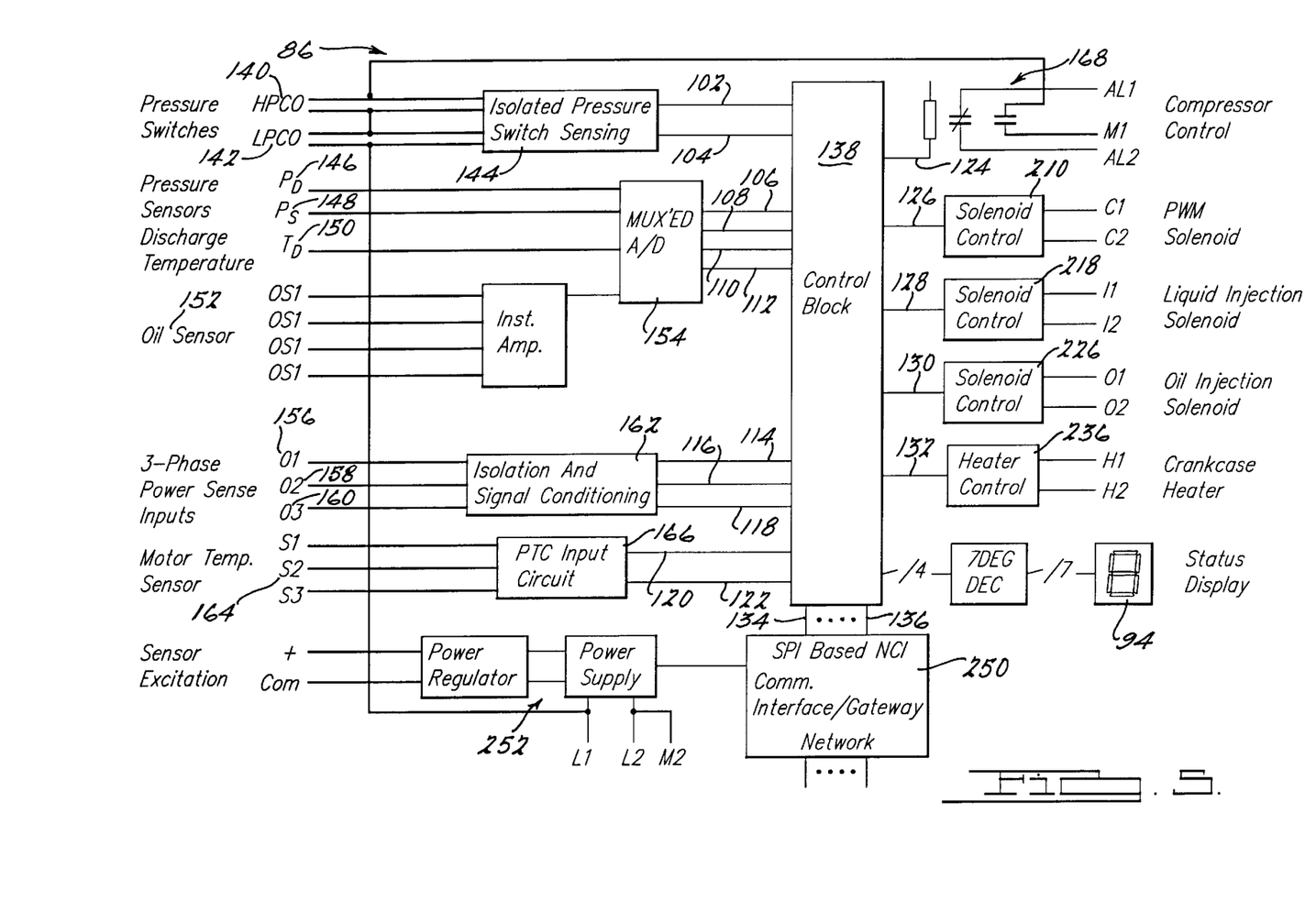

Referring now to FIGS. 4 and 5, a side view of compressor protection and control subsystem 86 is shown in FIG. 4 and a functional block diagram of compressor protection and control subsystem 86 is shown in FIG. 5. Compressor protection and control subsystem 86 includes status display 94 as well as terminals 102 through 136 some of which are connected to internally integrated sensors which are in turn connected to a control block 138. Terminals 102 and 104 are connected to a high pressure cut off switch 140 and a low pressure cut off switch 142 through an isolated pressure switch sensing monitor 144. High pressure cut off switch 140 will notify compressor protection and control subsystem 86 of a higher than acceptable pressure reading for compressor 10 and low pressure cut off switch 142 will notify compressor protection and control subsystem 86 of a lower than acceptable pressure reading for compressor 10.

Terminal 106 is connected to a pressure sensor 146 which monitors the discharge pressure of compressor 10. Terminal 108 is connected to a pressure sensord 148 which monitors the suction pressure of compressor 10. Terminal 110 is connected to a temperature sensor 150 which monitors the temperature of the discharge gas of compressor 10. Terminal 112 is connected to an oil level sensor 152 which monitors the oil level sump 46 of compressor 10. Input from sensors 146–152 are connected to terminals 106–112, respectively, through an analog to digital convertor 154 prior to being input to control block 138.

Terminals 114, 116, and 118 are connected to a first, a second and a third phase wiring, 156–160, for compressor 10 in order to monitor the status of the three-phase power supply for compressor 10. Wirings 156–160 are connected to control block 138 and terminals 114–118 through an isolation and signal conditioner 162. Terminals 120 and 122 are connected to a group of motor temperature sensors 164 through a PTC Input circuit 166. Terminal 124 is connected to a compressor control system 168 which indicates that all monitored systems are acceptable and compressor 10 is free to operate.

Vibration detection can be added to compressor protection and control subsystem 86 by incorporating a preferred vibration sensor 180 within compressor protection and control subsystem 86 as shown in dashed lines in FIG. 4. Vibration sensor 180 is shown in FIGS. 6 and 7 and it comprises a cover 182, a contractor ring 184, a terminal rod 186, a spring wire 188, a ball 190, and an end cap 192. Cover 182 is a generally rectangular shaped plastic component defining a internal circular bore 194. Contractor ring 184 is fit within an enlarged portion of bore 194 and rests against a shoulder 196 formed by bore 194. Terminal rod 186 extends through a side wall of cover 182. Terminal rod 186 is welded to contractor ring 184 such that the end of terminal rod 186 extending through cover 182 can be utilized as a solder point for vibration sensor 180.

Spring wire 188 is an L-shaped wire member which has one end of the L extending through the side wall of cover 182 and the opposite end of the L extending axially down the center line of circular bore 194 such that the end of spring wire 188 terminates in approximately the center of contractor ring 184. Ball 190 includes a radially extending bore 198 which extends from the outer surface of ball 190 to approximately the center of ball 190. Preferably, ball 190 and spring wire 188 are assembled by inserting spring wire 188 into bore 198 and applying a strong permanent epoxy or by other methods known well in the art. The end of spring wire 188 which extends out of cover 182 is used as a solder point for vibration sensor 180. End cap 192 is attached to cover 182 by use of a permanent set epoxy which seals bore 194 and thus protects the electrical contacts of vibration sensor 180.

Preferably, spring wire 188 is made from spring quality steel or music wire, ball 190 is made form stainless steel (either 302 or 304) and contractor ring 184 is made from a seamless 304 stainless steel hollow tubular stock. Contractor ring 184 and ball 190 are preferably plated with gold up to a thickness of 0.000015 inches to prevent oxidation. In the preferred method of fabricating, spring wire 188 and contractor ring 184 are molded in place. Ball 190 is then secure to spring wire 188 and then end cap 192 is assembled.

Ball 190 and spring wire 188 comprise a simple spring-mass system. Spring wire 188 has the dual purpose of serving as one electrical terminal and also to act as the stiffness member of the spring-mass system. Vibration sensor 180 is located on the circuit board for compressor protection and control subsystem 86 and is most sensitive to vibration in the plane which is perpendicular to the long axis of vibration sensor 180 or the long axis of spring wire 188. Sensor 180 is actually a form of electrical switch which requires a minimum displacement before the momentary circuit closures or pulses begin to appear. A sensor input network block includes an RC filter which reduces the noise content of the signal.

In a given orientation, the response of vibration sensor 180 is governed by the stiffness of spring wire 188 and the mass of ball 190. System response is measured in terms of the amplitude of oscillations of ball 190 when vibration sensor 180 is attached to compressor 10. In principle, sensor 180 is designed to have a natural frequency close to the operating frequency of compressor 10. Preferably the natural frequency of sensor 180 is maintained on the higher side of the operating frequency of compressor 10 to eliminate nuisance trips. By controlling parameters such as the stiffness of spring wire 188, the mass of ball 190 and the gap between ball 190 and contractor ring 184, it is possible to design sensor 180 to trigger only above a specific value of input vibration. In this context, triggering is said to occur when ball 190 contacts ring 184. The stiffness of spring wire 188 is a function of the diameter, length and material of spring wire 188, the mass of ball 190 is a function of its material and its diameter. Thus, by making variations in these parameters, it is possible to change the response curve of sensor 180. The sensitivity of sensor 180 is determined by the gap between ball 190 and contact ring 184 and how close the natural frequency of sensor 180 is to the operating frequency of compressor 10. If the two frequencies are close, the system may be over sensitive; i.e. a small change in input vibration amplitude will result in a significant change in output vibration of movement of ball 190. Similarly, if the two frequencies are far apart, the system may be under sensitive and require a larger input vibration amplitude to cause a small change in output vibration or movement of ball 190. Computer studies and parallel experimental work has determined that a preferred sensor 180 will trigger at input signal levels of 10–15 mils of input vibration. This preferred design is insensitive to input vibration under 8 mils.

One issue which needs to be addressed with vibration sensor 180 is it must have the ability to distinguish between a true excessive vibration condition and the normal transient vibrations experienced during start up, flooded start, shut down and the like. Compressor protection and control subsystem module 86 preferably includes a first counter which continuously counts any pulses or triggering that are present using a 10 second time interval. If the number of pulses counted during any 10 second interval exceeds a predetermined number, a limit condition flag is turned on. Conversely, if the number of pulses counted during any 10 second interval is less than a predetermined number, the limit condition flag is turned off. Compressor protection and control subsystem 86 implements a second counter which is an up-down counter. It is clocked by an internal 1 second clock. The counter is limited to 0 counts in the down direction and 120 counts in the up direction. If the condition limit flag is turned on, the counter counts up. If the limit condition flag is turned off, the counter counts down. If at any time the count reaches 120, control and protection module 86 turns off the control relay and sets status display 94 to indicate a "vibration trip condition". Recycling of power to compressor protection and control subsystem 86 is required to clear this condition and reset the counter to 0.

Control block 138 of compressor protection and control subsystem 86 can also be used to control other various and perhaps optional systems incorporated into compressor 10. Terminal 126 is designed to be connected to a solenoid control system 210 which in turn is connected to an unloading control for a compressor for controlling the capacity of a compressor 214 shown in FIG. 8. Compressor 214 is identical to compressor 10 except for the incorporation of a capacity control system 216 which is controlled by control block 138.

Figure 9:
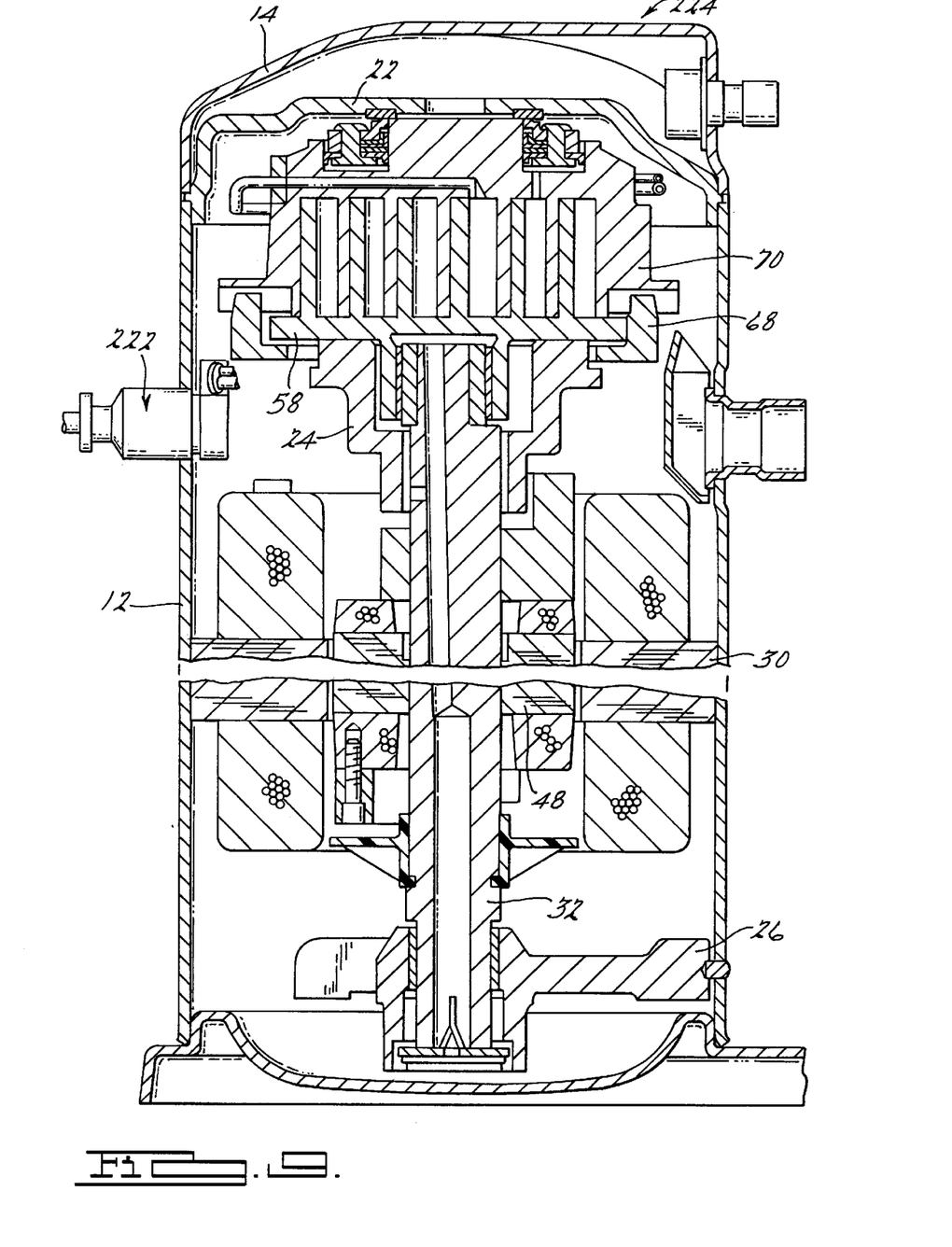
FIG. 9 is a vertical cross-sectional view of a compressor having a liquid injection system.

Terminal 128 is designed to be connected to a solenoid control system 218 which is, in turn, connected to a liquid injection system 222 for controlling the liquid injection for a compressor 224 shown in FIG. 9. Compressor 224 is identical to compressor 10 except for the incorporation of liquid injection system 222.

Terminal 130 is designed to be connected to a solenoid control system 226 which is, in turn, connected to an oil injection system 230 for controlling oil injection for a compressor 234 shown in FIG. 10. Compressor 234 is identical to compressor 10 except for the incorporation of oil injection system 230.

Terminal 132 is designed to be connected to a heater control system 236 which is, in turn, connected to a crankcase heater 238 for heating the lubricating oil in sump 46 of compressor 10 as shown in FIG. 1.

While FIGS. 8–10 each show a separate system added to compressor 10, it is within the scope of the present invention to include one or more of systems 216, 222 or 230 if desired.

Communication with control block 138 of compressor protection and control subsystem 86 is provided by a communication interface or gateway 250 which communicates with control block 138 through terminals 134 and 136. DC voltage to power the various sensors is provided a power supply system 252. Gateway 250 uses Motorola's Serial Peripheral Interface (SPI) for communicating with bridge or gateway modules. Motorola's SPI was designed to allow communications between a microcontroller and integrated circuits on a board providing expanded peripheral functions. Another bus, the $I^2C$ is similar to the SPI and was developed by Signetics/Philips Semiconductor. By using one of these buses, the only hardware required for connection to a pluggable gateway board is a suitable connector. By taking this approach, the system communications protocol is limited only by the gateways made available.

The SPI and $I^2C$ are the lowest cost approaches to providing communications and all that is needed is an adapter or a gateway. The preferred embodiment uses a serial interface using RS-485. The protocol used by the advanced compressor control and protection system of the present invention for either the simple SPI-to-gateway communications or in the case of an RS-485 based local network application is a master-slave protocol. The system control is the master when the local RS-485 interface is used. If another protocol is required, the gateway module acts as the master on the compressor control interface side.

Node Address Assignments

There are 32 node addresses to specify the target node. Address 0 is reserved for master broadcast messages. Address 31 is reserved for messages to the bus master. The remaining addresses are available for slave nodes. The Node Address is contained in the five most significant bits of Byte 0.

Message Types

The message type is contained in the least significant three bits of Byte 0. Eight message types are defined as follows:

1. Slave Status Request—This message is used by the system master to interrogate a slave node for its status. The addressed slave responds with one or more Status Reply messages. This message has a packet length of zero (0).
2. Status Reply—This message is used by slave nodes as a reply to Slave Status Request messages from the system master.
3. Control Commands—A Command Control message is used to control the actuator outputs of a slave node. Packet zero (0) of this message type is always a single byte and is used as a hardware reset command. All bits set to 1's generate a hardware reset in the slave node.
4. Configuration Request—The Configuration Read message is used by the system master to command a slave node to send its configuration data by means of one or more data packets contained in Configuration Data messages. This message has a packet length of zero (0).
5. Configuration Data—The Configuration Data message is used to send data packets containing the slave node's configuration data when the slave node has received a Configuration Read message. This is typically data stored in the slave node's EEROM of Flash Memory storage. It causes information which identifies the node type, serial number, date of manufacture, event histories, etc.
6. Sensor Read Request—The Sensor Read message is sent by the system master to command the slave node to send its sensor data. This message has a packet length of zero (0).
7. Sensor Data—This message type is sent by a slave node in response to the Sensor Read message from the system master.
8. Receipt Response—The Receipt Response message is sent by a slave node in response to messages from the system master which do not require data to be returned. This data packet is always a 1 byte ACK or NAK.

Packet Number

A message type may have up to 8 packets. Each packet may be 1 to 32 bytes in length and is sent in a separate message. The first message sent has the packet number set to the number of packets to be sent. Each subsequent message has the packet number decremented. The last message contains the last packet to be sent and is packet number zero (0).

The packet Number is contained in the most significant 3 bits of Byte 1.

Packet Length

The Packet Length specifies the length of the Data Packet in each message. The Packet Length is contained in the least significant 5 bits of Byte 1. Each message contains a data packet with up to 31 data bytes. The only exception is a packet length of zero (0) bytes. In this case there is no data packet in the message.

Node Types

Node definitions can be created for any component in a system that is capable of supporting communications. A good example would be a refrigeration case control. Or if partitioning of the system is desired, node definitions for individual or groups of sensors and actuators would make sense. These definitions would define the specific messages and their content as required for the particular devices. This document release focuses on the compressor node only.

Compressor Node

The compressor node utilizes all message types available. The Configuration data message type 5 is used to transfer the compressor configuration data between the system master and each compressor node. The compressor is shipped with the data preconfigured. The system master may send a Configuration Request to a selected compressor node and get an image of the stored data. It may modify that data or it may construct a completely new image and send it to the compressor for storage by sending it in the appropriate series of Configuration Data packets. Typical configuration variables are listed below.

Configuration Data List

Compressor Information
Compressor Model Code
Compressor Serial Number
Application
Application Temperature Range
Refrigerant Code
Oil Code
Oil Charge
Customer Information
Customer Name
Customer Model Number
Control Configuration
Anti Short Cycle Time
Discharge Pressure Cut-in
Discharge Pressure Cut-out
Discharge Pressure Sensor Option Enabled
Discharge Trip Time
Discharge Multiplier
Discharge Divider
Discharge Temperature Cut-out
Oil Add Set Point
Oil Stop Add Set Point
Oil Trip Set Point
Oil On Time
Oil Off Time
Oil Add Period
Shake Limit (pulses/10 second period.)
Shake Count (number of periods)
Suction Pressure Low Limit
Suction Pressure High Limit
Suction Multiplier
Suction Divider
Suction Pressure Sensor Option Additional information in the Configuration Data category is certain history information as listed below.

Event History
Compressor Cycles
Compressor On Time
Discharge Pressure Trips
Discharge Temperature
Motor Trips
Oil Trips
Suction Pressure Limit Trips
Shake Limit Trips
Events Since Cleared Using the above described protocol, some typical sensor data which would be sent in response to a sensor data request would be as detailed below.

Figure 11:
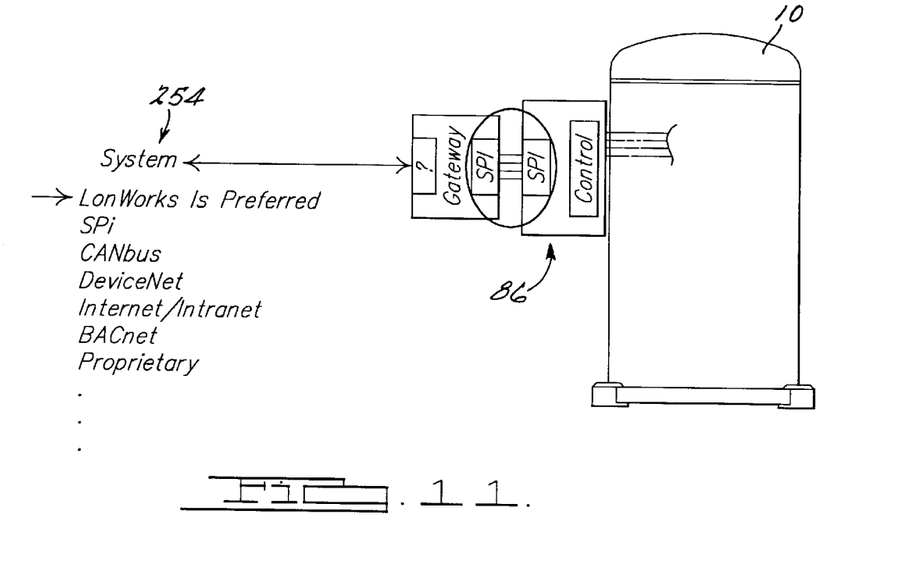
FIG. 11 is a schematic illustration of the gateway options available for the compressor.
Figure 12:
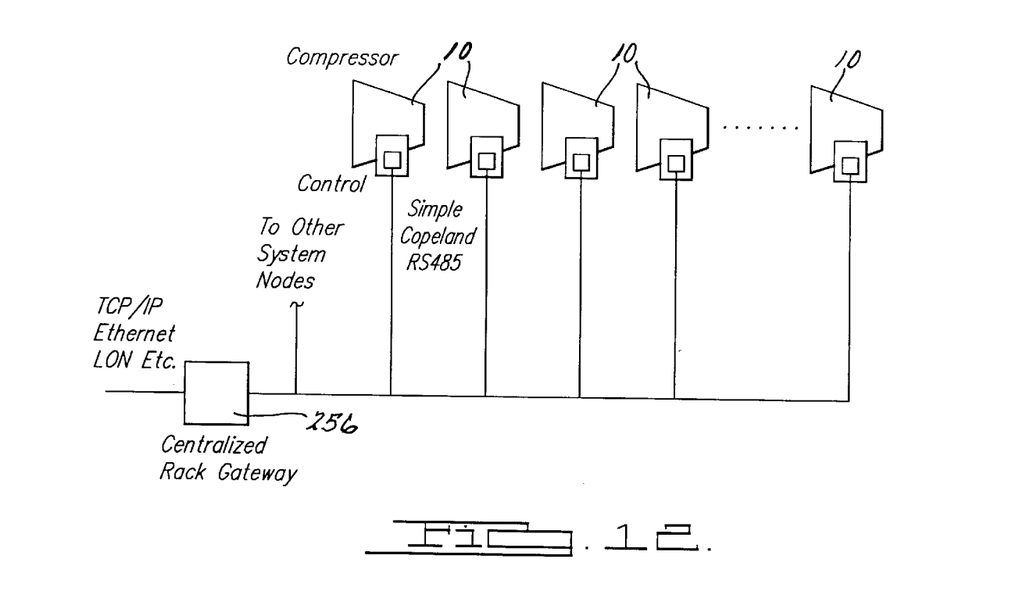
FIG. 12 is a schematic representation of a control system for a plurality of compressors using various gateways.
Figure 13:
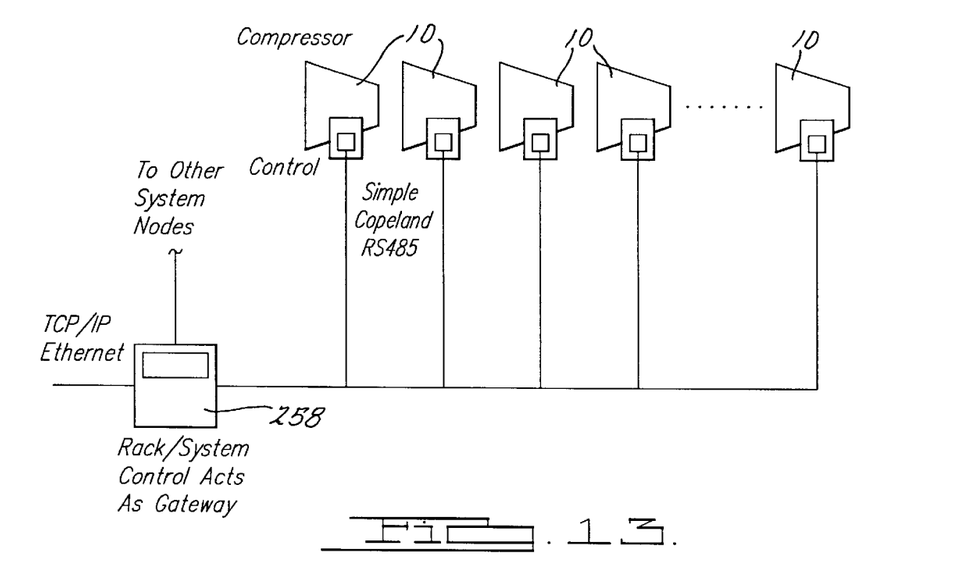
FIG. 13 is a schematic representation of another control system for a plurality of compressors using various gateways.
Figure 14:
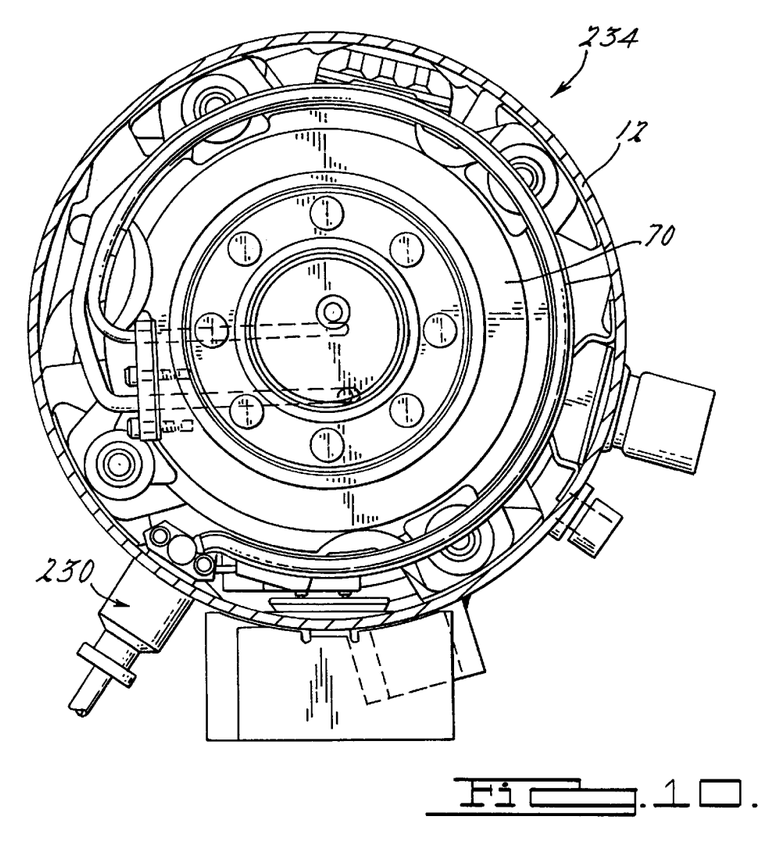
FIG. 14 is a schematic representation of another control system for a plurality of compressors using various gateways.

Anti Short Cycle Time—32 bit unsigned (mS)
Discharge Pressure Cut-in—32 bit signed (up to 6553.5 kPa, res. 0.1 kPa)
Discharge Pressure Cut-out—32 bit signed (up to 6553.5 kPa, res. 0.1 kPa)
Discharge Trip Time—16 bit unsigned (res. 0.01 S)
Discharge Multiplier—32 bit unsigned
Discharge Divider—32 bit unsigned
Suction Pressure Cut-in—32 bit signed (+,−3276.7 kPa, res. 0.1 kPa)
Oil Stop Add—16 bit unsigned
Suction Pressure Cut-out—32 bit signed (+,−3276.7 kPa, res. 0.1 kPa)
Suction Multiplier—32 bit unsigned
Suction Divider —32 bit unsigned
Oil Add—16 bit unsigned
Oil Trip—16 bit unsigned
Oil On Time—32 bit unsigned (mS)
Oil Off Time—32 bit unsigned (mS)
Oil Add Period—16 bit unsigned (0.01 S)
Vibration Limit—16 bit unsigned—pulses/10 s
Vibration Count—8 bit unsigned—10 s periods Referring now to FIG. 11, compressor 10 is illustrated showing the Serial Peripheral Interface (SPI) for connecting compressor protection and control subsystem 86 of compressor 10 to a central control system 254. Using the SPI interface and the gateway, subsystem 86 of compressor 10 can be controlled by and communicate with a master network. The connection and communication with the master network is preferably through LonWorks but other network connections such as SPi, CANBus, Device Net, Internet/Intranet, BAC net or a Proprietary connection can be established. FIG. 12 illustrates the network system when a centralized rack gateway 256 is utilized to communicate with a group of compressors 10, FIG. 13 illustrates the network system when a racksystem control 258 acts as the gateway for communicating with a group of compressors 10 and FIG. 14 illustrates the network system when an Internet web server 260 or a local Intranet server 262 is utilized to communicate with individual Ethernet gateways associated with each compressor 10.

One problem associated with the development of the advanced compressor control and protection system was an accurate oil level sensor applicable to compressors. The requirements for the sensor included that it have no moving parts, that it be compatible with the environment of the interior of the compressor in the sump and that its costs be competitive with current day float based sensors. Two concepts were deemed to have merit. First, self-heated thermistor with temperature compensation had the potential to be simple, reliable and low cost and second, capacitance was considered as a potentially reliable, accurate and low cost approach as well.

Figure 15:
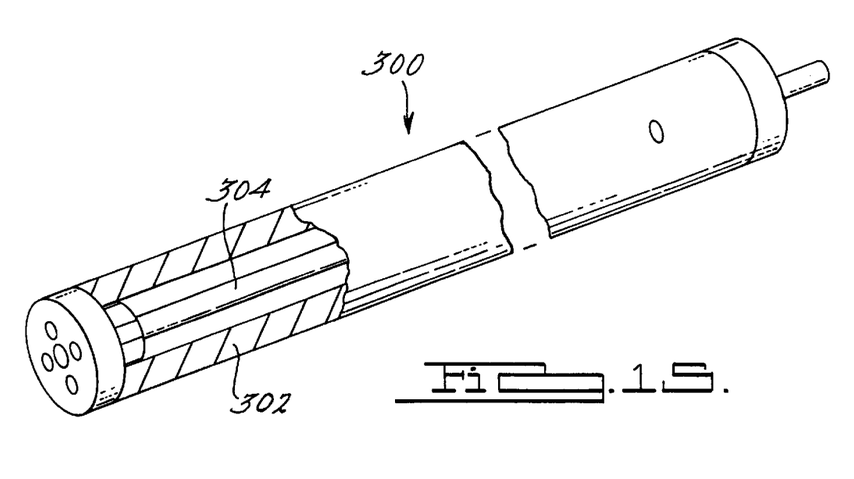
FIG. 15 is an oil sensor used with the compressor.

A capacitance based sensor 300 shown in FIG. 15 is one option for an oil sensor. There is a large enough dielectric constant of oil versus refrigerant gas to be able to derive a usable signal. The volume construction of such a device having a consistent capacitance from unit to unit without calibration is feasible if the electrodes are arranged coaxially. Sensor 300 is comprised of a hollow stainless tube 302 with a small coaxially positioned rod 304.

A multiple thermocouple liquid level sensor 320 is shown in FIG. 16. Sensor 320 comprises an unevenly heated thermocouple array 322. Sensor 320 requires a compensation for the effect of different gas densities by using a separate unevenly heated thermocouple pair which is always disposed within the suction gas of the compressor. A mathematical model was developed using the output from the thermocouple disposed in the gas to correct the output of the thermocouple disposed in the lubricant for variation pressure and temperature of the suction gas over the compressor's operating envelope.

Figure 17:
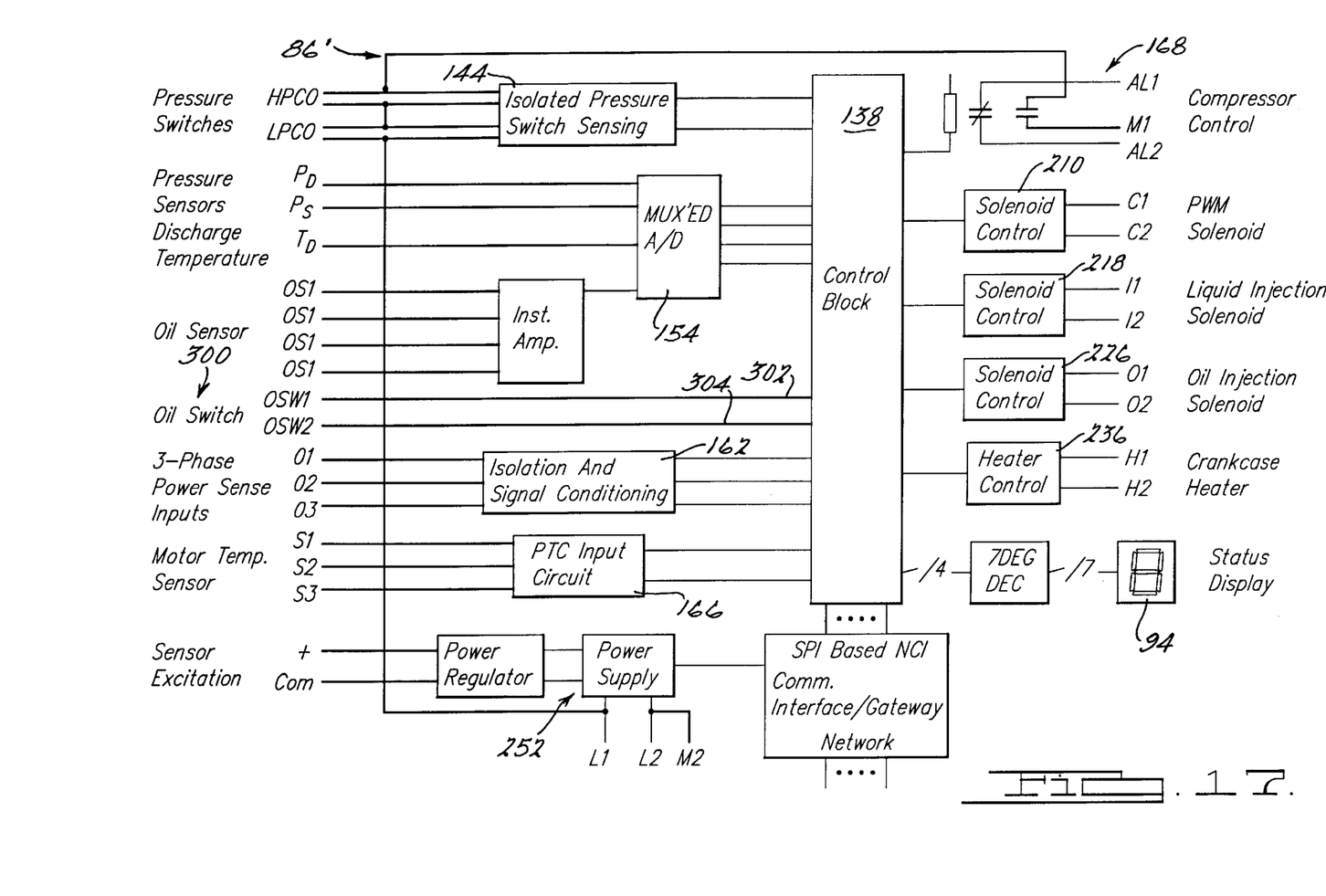
FIG. 17 is a functional block diagram of the compressor protection and control subsystem for a semi-hermetic compressor.

Referring now to FIG. 17, a system schematic for a compressor protection and control subsystem 86' for use with a semi-hermetic rotary compressor is disclosed. Subsystem 86', shown in FIG. 17, is similar to subsystem 86 shown in FIG. 5 except for the addition of control for an oil switch 300. A semi-hermetic rotary compressor is similar to a hermetic rotary compressor except that the shell for the semi-hermetic rotary compressor is bolted together rather than being welded as shown for shell 12. in addition, the semi-hermetic rotary compressor is typically equipped with a positive displacement lubricant pump which maintains an oil pressure within the lubrication system for the semi-hermetic rotary compressor. A pressure sensor monitors the pressure for the lubrication system with the pressure sensor communicating with control block 138 through a pair of terminals 302 and 304. Logic within control block 138 monitors the lubrication after lubrication pressure is determined to be low or inadequate for a specified period of time. The time delay used for controlling the compressor for a lack of sufficient oil pressure avoids problems associated with mis-trips caused to varying oil pressure. The function and operation of the remainder of compressor protection and control subsystem 86' is the same as that described above for compressor protection and control subsystem 86.

While the above detailed description describes the preferred embodiment of the present invention, it should be understood that the present invention is susceptible to modification, variation and alteration without deviating from the scope and fair meaning of the subjoined claims.

What is claimed is:

1. A compressor assembly comprising:
   a compressor;
   at least one temperature sensor associated with said compressor;
   at least one pressure sensor associated with said compressor;
   a control block in communication with said at least one temperature sensor and said at least one pressure sensor, said control block being operable to monitor operational characteristics of said compressor;
   a gateway in communication with said control block, said gateway providing a connector for external control of said compressor assembly; and
   a central control in communication with said gateway through said connector.

2. The compressor assembly according to claim 1, further comprising an oil level sensor in communication with said control block.

3. The compressor assembly according to claim 2, wherein said compressor includes a shell, said oil level sensor being disposed within said shell.

4. The compressor assembly according to claim 2, further comprising a crankcase heater associated with said compressor, said crankcase heater being in communication with said control block.

5. The compressor assembly according to claim 1, further comprising a solenoid control system in communication with said control block.

6. The compressor assembly according to claim 5, wherein said compressor includes a capacity control system, said capacity control system being in communication with said solenoid control system.

7. The compressor assembly according to claim 5, wherein said compressor includes a liquid injection system, said liquid injection system being in communication with said solenoid control system.

8. The compressor assembly according to claim 5, wherein said compressor includes an oil injection system, said oil injection system being in communication with said solenoid control system.

9. A compressor protection and control system comprising:
   a plurality of compressors;
   a control block associated with each of said plurality of compressors;
   at least one temperature sensor associated with each of said plurality of compressors, each of said at least one temperature sensor being in communication with a respective control block;
   at least one pressure sensor associated with each of said plurality of compressors, each of said at least one pressure sensor being in communication with a respective control block;
   a gateway in communication with each of said control blocks, said gateway providing a connector for external control of a respective compressor; and
   a central control in communication with said gateway through said connector.

10. The compressor protection and control system according to claim 9, further comprising an oil level sensor associated with each of said plurality of compressors, each of said oil level sensor being in communication with a respective control block.

11. The compressor protection and control system according to claim 10, wherein each of said plurality of compressors includes a shell, each of said oil level sensors being disposed within a respective shell.

12. The compressor protection and control system according to claim 9, further comprising a crankcase heater associated with each of said plurality of compressors, each of said oil level sensors being in communication with a respective control block.

13. The compressor protection and control system according to claim 9, further comprising a solenoid control system associated with at least one of said plurality of compressors, said solenoid control system being in communication with a respective control block.

14. The compressor protection and control system according to claim 13, wherein said solenoid control system includes a capacity control system, said capacity control system being in communication with said solenoid control system.

15. The compressor protection and control system according to claim 13, wherein said solenoid control system includes a liquid injection system, said liquid injection system being in communication with said solenoid control system.

16. The compressor protection and control system according to claim 13, wherein said solenoid control system includes an oil injection system, said oil injection system being in communication with said solenoid control system.

17. The compressor assembly according to claim 1, wherein said gateway communicates with said control block through a serial peripheral interface.

18. The compressor assembly according to claim 1, wherein said gateway is a rack/system control.

19. The compressor assembly according to claim 1, wherein said gateway is an Internet web server.

20. The compressor protection and control system according to claim 9, wherein said gateway communicates with said control block through a serial peripheral interface.

21. The compressor protection and control system according to claim 9, wherein said gateway is a racksystem control.

22. The compressor protection and control system according to claim 9, wherein said gateway is an Internet web server.

* * * * *

UNITED STATES PATENT AND TRADEMARK OFFICE
CERTIFICATE OF CORRECTION

PATENT NO. : 6,302,654 B1
DATED : October 16, 2001
INVENTOR(S) : Hank E. Millet et al.

It is certified that error appears in the above-identified patent and that said Letters Patent is hereby corrected as shown below:

<u>Title page,</u>
Item [57], ABSTRACT, after "conditions" insert -- , --.

<u>Column 1,</u>
Line 21, "the" should be -- they --.
Line 49, "phasesingle" should be -- phase/single --.

<u>Column 2,</u>
Line 6, "compressor" should be -- compressors --.

<u>Column 4,</u>
Line 18, "crank pin 32" should be -- crank pin 34 --.
Line 19, "Crank pin 32" should be -- Crank pin 34 --.
Line 25, "bearing h housing" should be -- bearing housing --.

<u>Column 5,</u>
Line 28, "sensord" should be -- sensor --.
Line 57, "a" should be -- an --.

<u>Column 6,</u>
Line 13, "form" should be -- from --.

Signed and Sealed this

Fifteenth Day of April, 2003

JAMES E. ROGAN
*Director of the United States Patent and Trademark Office*